(12) United States Patent
Rieul et al.

(10) Patent No.: US 10,474,803 B2
(45) Date of Patent: Nov. 12, 2019

(54) DEVICE AND METHOD FOR OPTICAL CAPTURE AT DIFFERENT WAVELENGTHS EMITTED SEQUENTIALLY

(71) Applicant: SAFRAN IDENTITY & SECURITY, Issy les Moulineaux (FR)

(72) Inventors: Francois Rieul, Issy les Moulineaux (FR); Jean Beaudet, Issy les Moulineaux (FR)

(73) Assignee: IDEMIA IDENTITY & SECURITY, Issy les Moulineaux (FR)

( * ) Notice: Subject to any disclaimer, the term of this patent is extended or adjusted under 35 U.S.C. 154(b) by 0 days.

(21) Appl. No.: 15/584,804

(22) Filed: May 2, 2017

(65) Prior Publication Data

US 2017/0316195 A1    Nov. 2, 2017

(30) Foreign Application Priority Data

May 2, 2016 (FR) ...................... 16 53965

(51) Int. Cl.
| | |
|---|---|
| *G06F 21/00* | (2013.01) |
| *G06F 21/32* | (2013.01) |
| *G06F 21/62* | (2013.01) |
| *G06K 9/00* | (2006.01) |

(Continued)

(52) U.S. Cl.
CPC ............ *G06F 21/32* (2013.01); *G06F 21/629* (2013.01); *G06K 9/0004* (2013.01); *G06K 9/0012* (2013.01); *G06K 9/00013* (2013.01); *G06K 9/00087* (2013.01); *G06K 9/00107* (2013.01); *G06K 9/00899* (2013.01);

(Continued)

(58) Field of Classification Search
CPC ... G06F 21/32; G06F 21/629; G06K 9/00013; G06K 9/0004; G06K 9/00087; G06K 9/00107; G06K 9/0012; G06K 9/00899; G06K 9/2018; G06K 9/2027; H04N 5/30
See application file for complete search history.

(56) References Cited

U.S. PATENT DOCUMENTS

| | | | |
|---|---|---|---|
| 2009/0148005 A1* | 6/2009 | Rowe ................. | G06K 9/00046 382/115 |
| 2010/0148068 A1* | 6/2010 | Schwaneberg ....... | G06K 9/0012 250/338.4 |

(Continued)

FOREIGN PATENT DOCUMENTS

| | | |
|---|---|---|
| EP | 2 070 005 A1 | 6/2009 |
| WO | WO 2008/028045 | 3/2008 |

(Continued)

OTHER PUBLICATIONS

L. Brabec, "Biometric Liveness Detection for the Fingerprint Recognition Technology," BRNO University of Technology, Master Thesis, May 27, 2015, 48 pages.

*Primary Examiner* — Ping Y Hsieh
(74) *Attorney, Agent, or Firm* — Muncy, Geissler, Olds & Lowe, P.C.

(57) ABSTRACT

A device and method, the purpose of which is to secure digital fingerprint reading by sequential optical captures with optimization of the exposures to light. At least one of the illumination and detection parameters is adjusted as a function of the acquisition conditions (physiological condition of the epidermis, exposure to ambient light) owing to the means of control.

20 Claims, 1 Drawing Sheet

(51) Int. Cl.
*H04N 5/30* (2006.01)
*G06K 9/20* (2006.01)

(52) U.S. Cl.
CPC ......... *G06K 9/2018* (2013.01); *G06K 9/2027* (2013.01); *H04N 5/30* (2013.01)

(56) References Cited

U.S. PATENT DOCUMENTS

2015/0205992 A1* 7/2015 Rowe .................. G06K 9/2018
382/124
2015/0339471 A1* 11/2015 Bennett .................. G06F 21/32
726/19

FOREIGN PATENT DOCUMENTS

WO   WO 2012/005809         1/2012
WO   WO2012/005809 A1 *   1/2012

\* cited by examiner

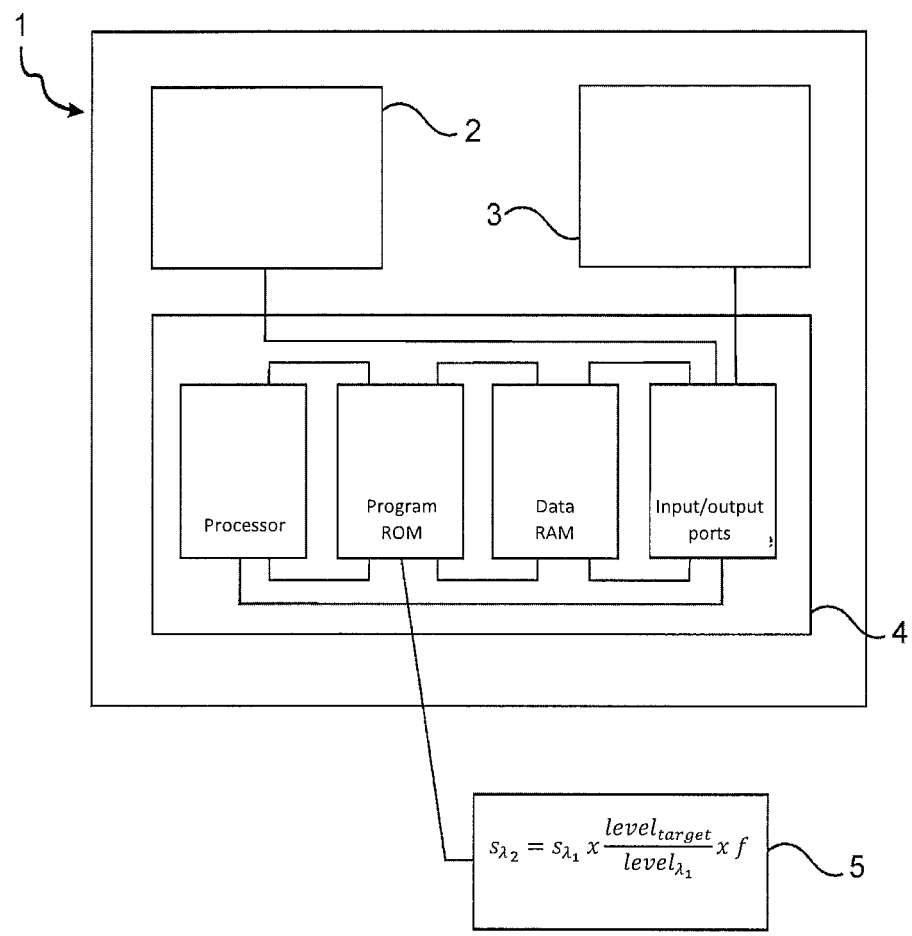

DEVICE AND METHOD FOR OPTICAL CAPTURE AT DIFFERENT WAVELENGTHS EMITTED SEQUENTIALLY

The present invention relates to the field of biometrics and more particularly to a device and a method for optical fingerprint capture. The invention is usable in different types of application, such as access clearance for protected areas such as airport departure lounges or companies, or unlocking of equipment such as mobile telephones of the "smartphone" type, portable computers or furthermore strong boxes.

BACKGROUND OF THE INVENTION

Identification of an individual by electronic means for biometric identification has developed substantially owing to progress in information technology and microelectronics, achieving a high degree of rapidity and reliability.

In the methods commonly used, identification is a result of digital fingerprint recognition, but may also be the result of facial recognition, vocal recognition, morphological recognition or indeed iris recognition.

It is known to perform biometric fingerprint acquisition using an optical capture device.

The operating principle of this technology is well known. Acquisition involves capturing a partial or complete area of the individual's dermatoglyphic structure. This area is usually restricted to one or several of the individuals' distal phalanges.

Commonly, the capture device comprises an optical sensor combined with a means of illumination providing controlled exposure to light of said phalanges. The exposure to light is controlled in order to increase the contrast of the papillary lines and hence increases identification accuracy.

The quantity of light may vary significantly depending on ambient lighting, but may also vary according to the physiological status of the finger (for example, depending on whether the finger is dry or moist). The lighting level needs to be adapted to these conditions in order to increase acquisition quality.

Furthermore, it is known to use light radiation of different wavelengths in order to facilitate fraud detection.

AIM OF THE INVENTION

An aim of the present invention is to improve the biometric acquisition performances by utilising various properties of the skin in the presence of radiation of different wavelengths.

BRIEF DESCRIPTION OF THE INVENTION

With a view to achieving this aim, the invention proposes an optical digital fingerprint capture device comprising:
- a means of illumination suitable for emitting a first light radiation with at least a first wavelength and a second light radiation with at least a second wavelength different from the first;
- an optical sensor sensitive to the light radiation at the first wavelength and at the second wavelength;
- a means of control of the means of illumination and of the means of detection, which is arranged to control sequentially:
  the illumination by the first light radiation and a first capture of a first image by the optical sensor;
  the illumination by the second light radiation and a second capture of a second image by the optical sensor;
wherein the means of control is arranged in order to:
  slave, as a function of a level of detection of the first light radiation by the optical sensor, at least one emission parameter of the second light radiation and/or at least one parameter of the second capture;
  process the second image in order to extract therefrom biometric characteristics representative of a digital fingerprint.

Light radiation implies radiation, the wavelength of which is included within the range extending from ultraviolet to infra-red. The device according to the invention allows use of the capture performed under the first radiation not only in order to acquire biometric characteristics, but also in order to adjust at least one parameter of the capture performed under the second radiation. This makes it possible to take account for example of the ambient lighting and of the humidity of the finger which may have influenced the first capture and limit the influence on the second capture.

The invention also relates to a method for optical capture of a fingerprint, wherein the method comprises the stages of:
- performing a first optical capture of a first image under a first exposure to light at at least one first wavelength;
- performing a second optical capture of a second image under a second exposure to light at at least a second wavelength different from the first, wherein at least one parameter of this second capture is determined as a function of the first capture;
- deriving characteristics representative of a fingerprint from the second image.

A wavelength allowing relatively robust capture is selected as the first wavelength.

Preferably, the parameter of the second capture is adjusted as a function of the albedo of the skin of the finger calculated as a function of a light energy emitted during the first exposure to light and of a light energy detected during the first capture.

Advantageously, the method comprises the additional stages of:
- performing an intermediate optical capture under exposure to ambient light;
- deducing a level of exposure to ambient light in order to calculate an optimisation ratio with respect to saturation of the second capture under the second radiation;
- taking account of this optimisation ratio in order to determine an optimum amplification parameter for the second optical capture.

Hence, account is taken of the influence of ambient illumination. For example, an illumination setpoint for the second capture takes account of the ambient illumination such that the sum of the level of the second radiation and that of the ambient illumination does not exceed the saturation level of the sensor.

Other characteristics and advantages of the invention will become apparent from reading the following description of a particular non-restrictive embodiment of the invention.

BRIEF DESCRIPTION OF DRAWINGS

Reference will be made to the single appended FIGURE showing an overall diagram of an optical capture device according to the invention.

DETAILED DESCRIPTION OF THE INVENTION

With reference to FIG. 1, the optical digital fingerprint capture device according to the invention comprises a frame delimiting a capture area and containing a means of illumination 2 of the capture area, a means of optical detection 3 and a means of control 4 connected to the means of illumination 2 and to the means of optical detection 3. A capture device of this kind is commonly known as a digital fingerprint reader.

In a manner known per se, the capture area is in this case defined by a pane on which the candidates for identification are required to place their hand. The means of illumination 2 and the means of optical detection 3 are arranged behind this pane.

The means of illumination 2 comprise in this case a series of light-emitting diodes arranged in order to emit a light radiation in the capture area. The light-emitting diodes have different wavelengths and can be controlled selectively in such a manner that the means of illumination 2 has a power and a wavelength that are variable such that the power and wavelength of the radiation are adjustable parameters. More specifically, the means of illumination 2 comprise light-emitting diodes, the wavelength of which is included within a first range of wavelengths close to red and light-emitting diodes, the wavelength of which is included within a second range of wavelengths close to blue or green.

The means of optical detection 3 comprise an optical sensor sensitive to radiation of different wavelengths. More specifically, the sensor is arranged to be sensitive to light radiation having a wavelength included within a range covering the visible spectrum and the infra-red spectrum. The sensor is arranged to have a gain and an exposure time that are adjustable.

With reference to FIG. 1, the means of control 4 comprise a micro-controller including a processor, a RAM, a ROM, a signal generator and at least one comparator.

It is arranged to control the means of illumination 2 so as to adjust the illumination parameters, i.e.:
the wavelength of the light radiation emitted;
the power of the light radiation emitted.

The means of control 4 are also arranged in order to control the means of detection 3 so as to adjust the detection parameters, i.e.:
the gain;
the exposure time.

The means of control 4 are arranged in order to perform adjustment of the illumination and detection parameters for a capture by determining setpoints based on the response obtained by the optical sensor during the previous capture.

The invention is based on the skin's properties of absorption and reflection. Indeed, the human epidermis has different properties depending on the wavelength of the light radiation to which it is exposed. The skin tends to absorb radiation close to red and conversely, the skin is highly reflective for radiation close to blue.

Hence, for an illumination in the visible spectrum, the level of the blue channel benefits in being amplified in case of a dry finger, otherwise the levels of reflected radiation detected by the sensor are extremely low and the radiation to noise ratio is low. Conversely, in case of a moist finger, the levels of reflected radiation detected by the sensor are close to saturation; a phenomenon that impairs the quality of acquisition.

The method of capture according to the invention comprises the following stages:
performing a first optical capture of a first image of a finger under an exposure to light at the first range of wavelengths;
calculating a reference level which is the mean over a predefined region of the first image of the finger;
calculating a setpoint for emission of the radiation at the second range of wavelengths;
performing a second optical capture of a second image of the finger under exposure to light at the second range of wavelengths;
deriving characteristics representative of a fingerprint from the second image.

The setpoint for emission of radiation at the second range of wavelengths is obtained by applying, for example, the following equation:

$$s_{\lambda_2} = s_{\lambda_1} * \frac{level_{target}}{level_{\lambda_1}} * factor_{\lambda_1 \to \lambda_2}$$

where
$s_{\lambda_1}$ is the setpoint of the first radiation at the first range of wavelengths;
$s_{\lambda_2}$ is the setpoint of the second radiation at the second range of wavelengths;
$level_{target}$ is the anticipated theoretical level of emission of the first radiation;
$level_{\lambda_1}$ is the actual level measured during emission of the first radiation;
$factor_{\lambda_1 \to \lambda_2}$ takes account of the skin albedo ratio between the radiation at the first wavelength and the radiation at the second wavelength, in addition to a ratio of the emission and detection system.

It will be noted that the time interval between the first capture and the second capture must be sufficiently short in order to rule out any attempt at fraud involving successively placing in front of the reader two objects, the combined analysis of the captures of which would have properties similar to that of the human epidermis.

According to an advantageous embodiment of the invention, the method incorporates measurement of the ambient illumination. One attempts to increase the quality of acquisition by taking account of the ambient illumination. To this end, an additional capture is performed between the first capture and the second capture.

The method subsequently comprises, following the first capture, the stages of:
performing, after having completed the first capture, an intermediate optical capture under exposure to ambient light ($level_{external}$);
deducing a level of exposure to ambient light in order to calculate an optimisation ratio with respect to saturation of the second radiation;
taking account of this optimisation ratio as an amplification parameter in order to perform a second optical capture under optimum exposure to light.

The optimisation ratio with regard to the saturation of the second radiation is known as m/sat and is calculated as follows:

$$\frac{m}{sat} = \frac{\min_x (sat - level_{external})}{sat}$$

where
m is a margin in order to maximise the quantity of radiation within the limit of saturation;
sat is the level of saturation of the exposure to light corresponding to the second radiation;
$level_{external}$ is the measured level of ambient illumination.
The optimisation ratio is taken into account as follows:

$$s'_{\lambda_2} = s_{\lambda_2} * \frac{m}{sat}$$

where
- $s_{\lambda_2}$ is the setpoint of the second radiation calculated as indicated above without taking account of the ambient lighting;
- $s'_{\lambda_2}$ is the setpoint of the second radiation taking account of the optimisation ratio;
- m/sat is the optimisation ratio.

Performance of several captures with different wavelengths allows measurement of the reflective and absorbent properties of the epidermis. By combining the results, the device allows detection of an artificial finger (or dummy finger). Media could be presented in front of the reader; for example, a digital fingerprint image, displayed on a screen or furthermore printed on a paper.

Of course, the invention is not limited to the described embodiment but encompasses any alternative solution within the scope of the invention as defined in the claims.

In particular, the first and second ranges of wavelengths may be different from those mentioned above. In particular, one of these ranges of wavelengths can extend outside the visible spectrum and cover the infra-red spectrum for example. These ranges may be more or less wide or cover different lengths.

The invention claimed is:

1. An optical digital fingerprint capture device comprising:
    an illuminator emitting a first light radiation with at least a first wavelength and a second light radiation with at least a second wavelength different from the first;
    an optical sensor sensitive to the light radiation at the first wavelength and at the second wavelength;
    a controller of the illuminator and of a detector, wherein the controller is arranged to control sequentially:
        the illumination by the first light radiation at the first wavelength and a first capture of a first image by the optical sensor;
        the setting, as a function of a level of detection of the first light radiation at the first wavelength by the optical sensor of at least one emission parameter of a second light radiation at the second wavelength and/or at least one parameter of the optical sensor for capturing a second image under the illumination by the second light radiation at the second wavelength; and
        the illumination by the second light radiation at the second wavelength and the second capture of the second image by the optical sensor using the set parameter;
    wherein the controller is arranged in order to
        process the second image in order to extract therefrom biometric characteristics representative of a digital fingerprint.

2. The optical capture device according to claim 1, wherein the controller is arranged to control an adjustment of an emission power of the second light radiation depending on the level of detection of the first light radiation.

3. The optical capture device according to claim 2, wherein the controller is a micro-controller.

4. The optical capture device according to claim 1, wherein the controller is arranged to control a gain of the optical sensor as a function of the level of detection of the first light radiation.

5. The optical capture device according to claim 1, wherein the second wavelength belongs to the visible spectrum.

6. The optical capture device according to claim 1, wherein the first wavelength belongs to the visible spectrum.

7. The optical capture device according to claim 1, wherein the controller comprises at least one processor, a RAM, a ROM, a signal generator and at least one comparator.

8. A method for optical capture of a fingerprint, wherein the method comprises the stages of:
    performing a first optical capture of a first image under a first exposure to light at at least one first wavelength;
    determining, as a function of the first capture, at least one parameter of a second optical capture under a second exposure to light at at least a second wavelength different from the first wavelength;
    performing the second optical capture of the second image under the second exposure to light at at least the second wavelength different from the first wavelength;
    deriving characteristics representative of a fingerprint from the second image.

9. The method according to claim 8, comprising the additional stages of:
    performing an intermediate optical capture under exposure to ambient light after having performed a first capture;
    deducing a level of the exposure to ambient light in order to calculate an optimisation ratio with respect to a saturation of the second radiation;
    taking account of this optimisation ratio in order to determine an optimum amplification parameter for the second optical capture.

10. A method for optical capture of a fingerprint, wherein the method comprises the stages of:
    performing a first optical capture of a first image under a first exposure to light at at least one first wavelength;
    performing a second optical capture of a second image under a second exposure to light at at least a second wavelength different from the first wavelength, wherein at least one parameter of this second capture is determined as a function of the first capture;
    deriving characteristics representative of a fingerprint from the second image;
    performing an intermediate optical capture under exposure to ambient light after having performed a first capture;
    deducing a level of the exposure to ambient light in order to calculate an optimisation ratio with respect to a saturation of the second radiation;
    taking account of this optimisation ratio in order to determine an optimum amplification parameter for the second optical capture;
wherein determination of the level of the second radiation is performed as a function of a level setpoint of the first radiation, a measurement of the level of the first radiation, of a target value level of the first radiation and of a skin albedo factor between the first wavelength and the second wavelength, of a ratio specific to the system consisting of a means of emission of the first radiation and an optical detection sensor.

11. A method for optical capture of a fingerprint, wherein the method comprises the stages of:
    performing a first optical capture of a first image under a first exposure to light at at least one first wavelength;
    performing a second optical capture of a second image under a second exposure to light at at least a second wavelength different from the first wavelength, wherein at least one parameter of this second capture is determined as a function of the first capture;

deriving characteristics representative of a fingerprint from the second images performing an intermediate optical capture under exposure to ambient light after having performed a first capture:

deducing a level of the exposure to ambient light in order to calculate an optimisation ratio with respect to a saturation of the second radiation:

taking account of this optimisation ratio in order to determine an optimum amplification parameter for the second optical capture;

wherein the ambient exposure level is deduced by subtraction of the measurement of a level of the first capture and of the level of the intermediate capture.

12. A method for optical capture of a fingerprint wherein the method comprises the stages of:

performing a first optical capture of a first image under a first exposure to light at at least one first wavelength;

performing a second optical capture of a second image under a second exposure to light at at least a second wavelength different from the first wavelength, wherein at least one parameter of this second capture is determined as a function of the first capture;

deriving characteristics representative of a fingerprint from the second image;

performing an intermediate optical capture under exposure to ambient light after having performed a first capture;

deducing a level of the exposure to ambient light in order to calculate an optimisation ratio with respect to a saturation of the second radiation;

taking account of this optimisation ratio in order to determine an optimum amplification parameter for the second optical capture;

wherein calculation of the optimisation ratio takes account of the minimum difference between the saturation level of the second radiation and the ambient exposure level.

13. A method for optical capture of a fingerprint, wherein the method comprises the stages of:

performing a first optical capture of a first image under a first exposure to light at at least one first wavelength:

performing a second optical capture of a second image under a second exposure to light at at least a second wavelength different from the first wavelength, wherein at least one parameter of this second capture is determined as a function of the first capture;

deriving characteristics representative of a fingerprint from the second image;

wherein the parameter of the second capture is adjusted as a function of the albedo of the skin of the finger calculated as a function of a light energy emitted during the first exposure to light and of a light energy detected during the first capture.

14. An optical digital fingerprint capture device comprising:

an illuminator emitting a first light radiation with at least a first wavelength and a second light radiation with at least a second wavelength different from the first;

an optical sensor sensitive to the light radiation at the first wavelength and at the second wavelength;

a controller of the illuminator and of a detector, wherein the controller is arranged to control sequentially:

a first illumination by the first light radiation and a first capture of a first image by the optical sensor; and a second illumination by the second light radiation and a second capture of a second image by the optical sensor;

wherein the controller is arranged in order to:

slave, as a function of a level of detection of the first light radiation by the optical sensor, at least one emission parameter of the second light radiation and/or at least one parameter of the second capture, the parameter of the second capture being adjusted as a function of the albedo of the skin of the finger calculated as a function of a light energy emitted during the first illumination to light and of a light energy detected during the first capture;

process the second image in order to extract therefrom biometric characteristics representative of a digital fingerprint.

15. The optical capture device according to claim 14, wherein the controller is arranged to control an adjustment of an emission power of the second light radiation depending on the level of detection of the first light radiation.

16. The optical capture device according to claim 15, wherein the controller is a micro-controller.

17. The optical capture device according to claim 14, wherein the controller is arranged to control a gain of the optical sensor as a function of the level of detection of the first light radiation.

18. The optical capture device according to claim 14, wherein the second wavelength belongs to the visible spectrum.

19. The optical capture device according to claim 14, wherein the first wavelength belongs to the visible spectrum.

20. The optical capture device according to claim 14, wherein the controller comprises at least one processor, a RAM, a ROM, a signal generator and at least one comparator.

* * * * *